United States Patent
Nakai et al.

(10) Patent No.: US 11,458,978 B2
(45) Date of Patent: Oct. 4, 2022

(54) DRIVE ASSIST METHOD, DRIVE ASSIST PROGRAM, AND VEHICLE CONTROL DEVICE

(71) Applicant: Panasonic Intellectual Property Management Co., Ltd., Osaka (JP)

(72) Inventors: Jun Nakai, Kanagawa (JP); Takashi Okohira, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 365 days.

(21) Appl. No.: 16/699,938

(22) Filed: Dec. 2, 2019

(65) Prior Publication Data

US 2020/0101977 A1    Apr. 2, 2020

Related U.S. Application Data

(63) Continuation of application No. PCT/JP2018/022306, filed on Jun. 12, 2018.

(30) Foreign Application Priority Data

Jun. 13, 2017 (JP) .............................. JP2017-116223

(51) Int. Cl.
*B60W 40/08* (2012.01)
*B60W 50/14* (2020.01)
(Continued)

(52) U.S. Cl.
CPC ............ *B60W 40/08* (2013.01); *B60W 50/14* (2013.01); *G05D 1/0061* (2013.01);
(Continued)

(58) Field of Classification Search
None
See application file for complete search history.

(56) References Cited

U.S. PATENT DOCUMENTS 5,884,249 A       3/1999   Namba et al.
9,513,632 B1 *   12/2016   Gordon ............ G08G 1/096791
(Continued)

FOREIGN PATENT DOCUMENTS

CN       106394319 A      2/2017
JP       S4-046111        2/1989
(Continued)

OTHER PUBLICATIONS

International Search Report of PCT application No. PCT/JP2018/022306 dated Jul. 24, 2018.
(Continued)

*Primary Examiner* — Abdhesh K Jha
(74) *Attorney, Agent, or Firm* — Greenblum & Bernstein, P.L.C.

(57) ABSTRACT

A vehicle control device includes: detecting at least one of a position or a state of occupant in a vehicle; determining an operation inputting part that is most easily operable for the occupant from among a plurality of operation inputting parts in the vehicle based on the at least one of the position or the state of the occupant which is detected in the detecting; notifying a consent request in the vehicle with respect to a processing content scheduled to be performed in response to an occurrence of an event; and validating consent operation to the operation inputting part that is most easily operable.

12 Claims, 9 Drawing Sheets

(51) Int. Cl.
  *G05D 1/00* (2006.01)
  *G06V 20/59* (2022.01)
(52) U.S. Cl.
  CPC ......... *G05D 1/0088* (2013.01); *G06V 20/597* (2022.01); *B60W 2050/146* (2013.01); *G05D 2201/0213* (2013.01)

(56) References Cited

U.S. PATENT DOCUMENTS

| | | | |
|---|---|---|---|
| 9,783,202 B2* | 10/2017 | Yamada | B60W 30/182 |
| 2005/0154505 A1 | 7/2005 | Nakamura et al. | |
| 2016/0196098 A1* | 7/2016 | Roth | G09G 5/00 |
| | | | 715/761 |
| 2017/0028987 A1 | 2/2017 | Yamada | |
| 2018/0113454 A1 | 4/2018 | Emura et al. | |
| 2018/0173237 A1* | 6/2018 | Reiley | G05D 1/0061 |
| 2018/0329414 A1 | 11/2018 | Igarashi et al. | |

FOREIGN PATENT DOCUMENTS

| | | |
|---|---|---|
| JP | 10-329575 | 12/1998 |
| JP | 3363283 B | 1/2003 |
| JP | 2005-283531 | 10/2005 |
| JP | 4305318 B | 7/2009 |
| JP | 2010-113601 | 5/2010 |
| JP | 2014-134897 | 7/2014 |
| JP | 2016-141283 | 8/2016 |
| WO | 2016/199379 | 12/2016 |
| WO | 2017/085981 | 5/2017 |

OTHER PUBLICATIONS

"Nissan IDS Concept", URL(Dec. 5, 2019): (https://global.nissannews.com/ja-JP/releases/release-3fa9beacb4b8c4dcd864768b4800bd67-151028-01-j).

Chinese Office Action from China National Intellectual Property Administration (CNIPA) dated May 9, 2022 for the related Chinese Patent Application No. 201880038127.9, together with an English language translation.

* cited by examiner

DRIVE ASSIST METHOD, DRIVE ASSIST PROGRAM, AND VEHICLE CONTROL DEVICE

RELATED APPLICATIONS

This application is a continuation of PCT International Application No. PCT/JP2018/022306, filed on Jun. 12, 2018, which claims the benefit of foreign priority of Japanese patent application 2017-116223 filed on Jun. 13, 2017, the contents all of which are incorporated herein by reference.

BACKGROUND

1. Technical Field

The present disclosure relates to a drive assist method, a drive assist program, and a vehicle control device applicable to a vehicle on which a plurality of operation inputting parts are installed.

2. Background Art

In recent years, the development of autonomous driving vehicles have been underway. In the autonomous driving vehicles, during an autonomous driving mode where a driver freed from a driving operation, the driver can ride on the vehicle in a free posture at a free position in a cabin. As the autonomous driving vehicles spread more widely, the layout of seats in the cabin is expected to be more flexible. In such case, there may be a situation where a driver is seated facing backward. With such a flexible seat layout, it is expected that displays are installed at a plurality of places in the cabin.

In the immediate future, however, it would be difficult to always travel in an autonomous driving mode irrelevant to a road condition and a peripheral environment. In a situation where the road condition and the peripheral environment are severe, it would be necessary for a driver to switch a driving mode from an autonomous driving mode to a manual driving mode where the involvement of the driver in driving is necessary. In such a case, a handover notification from a vehicle side to a driver side is necessary to switch a driving mode from an autonomous driving mode to a manual driving mode. The driver who has received the handover notification changes a driving mode from an autonomous driving mode to a manual driving mode by operating a mode switching switch or by performing a predetermined driving operation (for example, see Unexamined Japanese Patent Publication No. 10-329575).

SUMMARY

The present disclosure provides a technique that allows an occupant to take a quick response to a notification from a vehicle to the occupant.

A drive assist method according to one aspect of the present disclosure includes: detecting at least one of a position or a state of occupant in a vehicle; determining an operation inputting part that is most easily operable for the occupant from among a plurality of operation inputting parts in the vehicle based on the at least one of the position or the state of the occupant which is detected in the detecting; notifying a consent request in the vehicle with respect to a processing content scheduled to be performed in response to an occurrence of an event; and validating consent operation to the operation inputting part that is most easily operable.

As aspects of the present disclosure, an arbitrary combination of the above-mentioned constitutional elements, and the conversion of the expression of the present disclosure among a device, a system, a method, a program, a recording medium which records the program, an autonomous driving vehicle on which these are mounted and the like are effective.

According to the present disclosure, an occupant can take a quick response to a notification from a vehicle to the occupant.

BRIEF DESCRIPTION OF DRAWINGS

FIG. 6A is a view showing a state where the layout in a vehicle shown in FIG. 2A and FIG. 2B is changed.

FIG. 6B is a view showing a state where the layout in the vehicle shown in FIG. 2A and FIG. 2B is changed.

DETAILED DESCRIPTION OF PREFERRED EMBODIMENTS

Prior to the description of an exemplary embodiment of the present disclosure, drawbacks of the conventional art are briefly described. The switching method described in Unexamined Japanese Patent Publication No. 10-329575 is made on the premise that a driver is seated on a drive seat facing frontward. For example, a state is not expected where the driver is seated facing backward. In a state where a driver is seated facing backward, there arises a case where a driver cannot immediately recognize a handover notification from a vehicle side. Further, even in a case where the driver can immediately recognize the handover notification, there arises a case where the driver cannot immediately respond to the vehicle side. A notification from a vehicle side is not limited to a handover notification, and a permission request notification for transmitting a sign to the outside such as a horn or flashing is also possible. A quick response by a driver or an occupant is requested to the notification from the vehicle side.

Figure 1A:
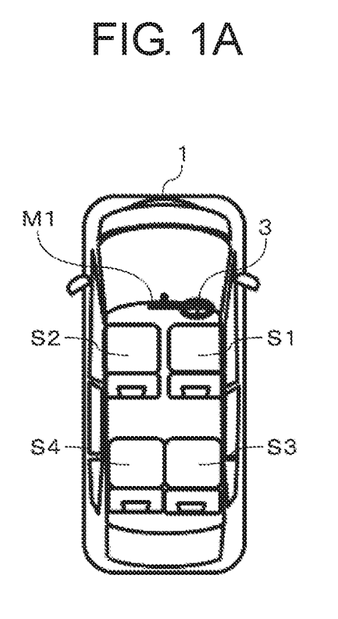
FIG. 1A is a view for illustrating a first example of a layout in a vehicle.
Figure 1B:
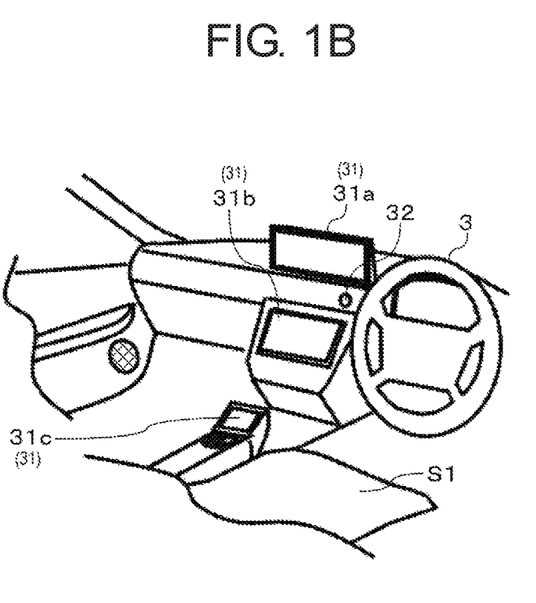
FIG. 1B is a view for illustrating the first example of the layout in the vehicle.

FIG. 1A and FIG. 1B are views for illustrating first example of a layout in vehicle 1. FIG. 1A is a schematic view of vehicle 1 as viewed from above, and FIG. 1B is a schematic view of a driver's seat and an area in the vicinity of the driver's seat in the vehicle 1. Vehicle 1 shown in FIG. 1A and FIG. 1B is a vehicle in accordance with four-seat specification, and steering wheel 3 is disposed on a right side. Inner rearview mirror M1 is disposed at the upper part of a windshield. The driver drives vehicle 1 sitting on right front seat S1.

As shown in FIG. 1B, on a dashboard, a touch-panel-type center display (hereinafter referred to as first touch panel display 31a) is installed. A-touch-panel-type head unit display (hereinafter referred to as second touch panel display 31b) is installed in a center lower portion of the dashboard. A-touch-panel-type small-sized display (hereinafter referred to as third touch panel display 31c) is installed on a center console. Physical button 32 is disposed in a region formed between first touch panel display 31a and second touch panel display 31b.

Figure 2A:
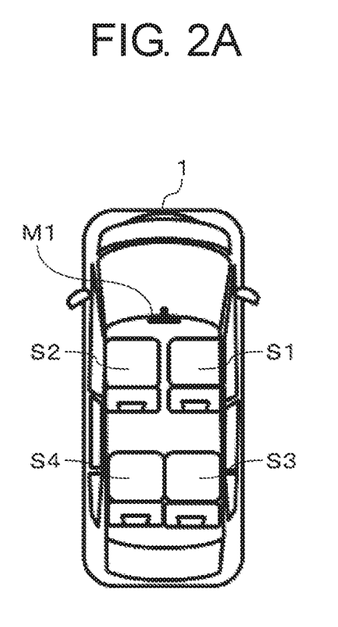
FIG. 2A is a view for illustrating a second example of a layout in a vehicle.
Figure 2B:
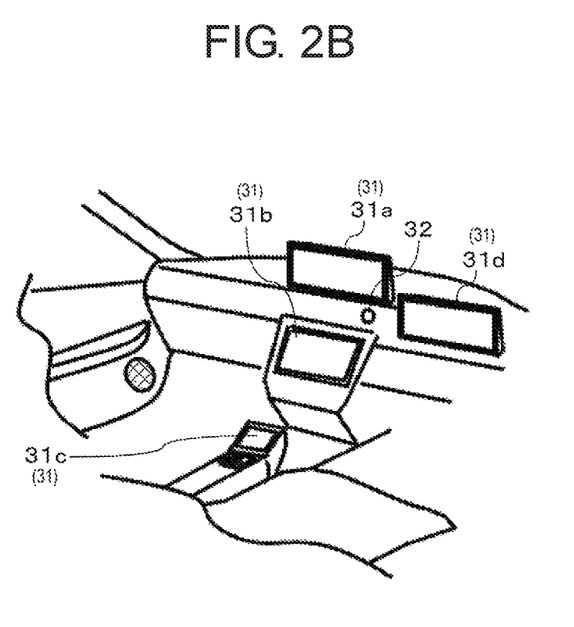
FIG. 2B is a view for illustrating the second example of the layout in the vehicle.

FIG. 2A and FIG. 2B are views for illustrating a second example of the layout in vehicle 1. FIG. 2A is a schematic view of vehicle 1 as viewed from above, and FIG. 2B is a schematic view of a front region in vehicle 1. With the spread of an autonomous driving vehicle, it is expected that a vehicle on which conventional steering wheel, accelerator pedal, and brake pedal are not mounted will be put into practice. Even in a case where a situation arises where manual driving is necessary, it is expected that a driving operation can be largely simplified compared to a conventional art. For example, it may be possible that a driving operation is performed using a miniaturized console terminal such as a joy stick. In this case, a steering part such as a conventional steering wheel or the like becomes unnecessary.

In the example shown in FIG. 2B, at a position where a steering wheel had been disposed conventionally, a-touch-panel-type display (hereinafter referred to as fourth touch panel display 31d) is disposed. Fourth touch panel display 31d can be used also for inputting a command (a passing command, a lane change command or the like) in a driving operation.

Figure 3A:
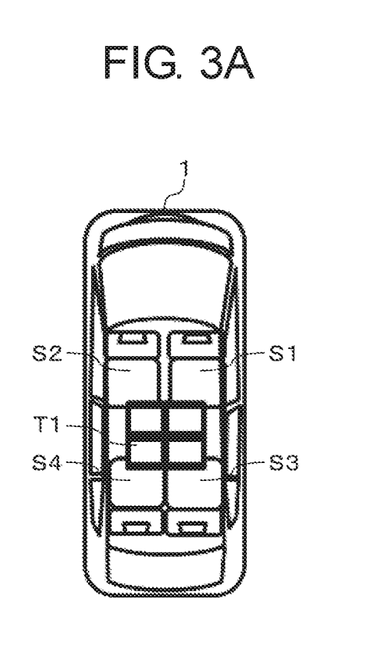
FIG. 3A is a view for illustrating a third example of a layout in a vehicle.
Figure 3B:
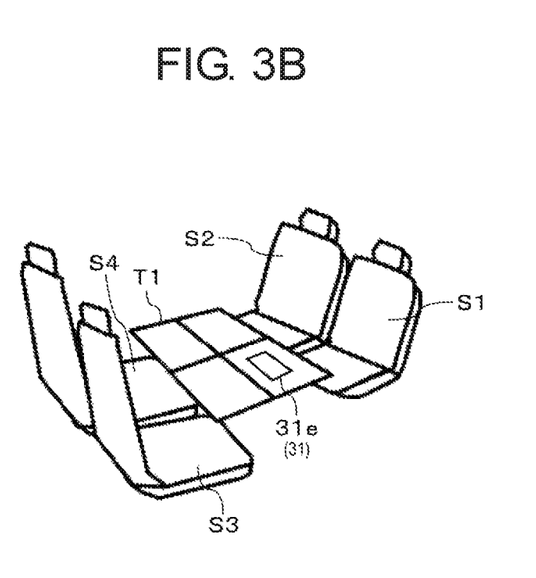
FIG. 3B is a view for illustrating the third example of the layout in the vehicle.

FIG. 3A and FIG. 3B are views for illustrating a third example of the layout in vehicle 1. FIG. 3A is a schematic view of vehicle 1 as viewed from above, and FIG. 3B is a schematic view showing one example of a seat layout in vehicle 1. The third example also adopts the configuration where a steering part such as a conventional steering wheel or the like is omitted in the same manner as the second example. In the third example, right front seat S1 and left front seat S2 are directed backward, and are disposed face-to-face with right rear sheet S3 and left rear sheet S4. Right front seat S1, left front seat S2, right rear seat S3 and left rear seat S4 may be a fixed type, or may be a rotationally movable type. Or, only right front seat S1 and left front seat S2 may change the directions thereof in a frontward direction.

In FIG. 3A and FIG. 3B, table T1 is disposed between right front seat S1 and left front seat S2, and right rear S3 and left rear seat S4. As shown in FIG. 3B, a touch-panel-type display (hereinafter referred to as fifth touch panel display 31e) is formed on a surface of table T1. Fifth touch panel display 31e may be realized as a physical display which is embedded in table T1 in advance, or may be realized as the combination of an ultra short focus projector and a gesture detection sensor.

Figure 4:
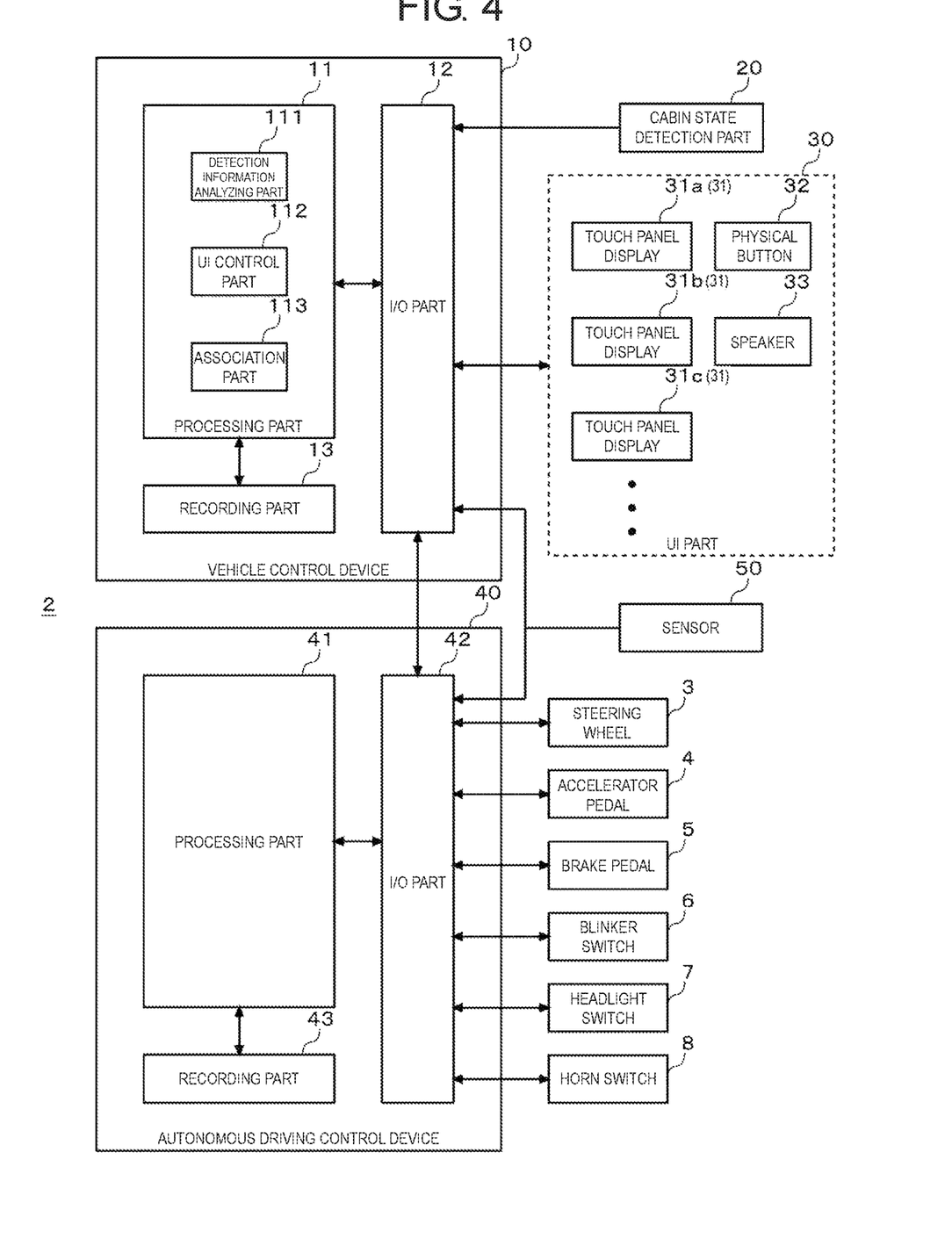
FIG. 4 is a block diagram showing the configuration of a drive assist system according to an exemplary embodiment of the present disclosure.

FIG. 4 is a block diagram showing the configuration of drive assist system 2 according to the exemplary embodiment of the present disclosure. Drive assist system 2 has vehicle control device 10, cabin state detection part 20, user interface (UI) part 30, autonomous driving control device 40 and sensor 50. Vehicle control device 10 is a human machine interface (HMI) controller which performs an interface function between vehicle 1 and an occupant. Autonomous driving control device 40 is an autonomous driving controller which performs an automatic drive function of vehicle 1. Vehicle control device 10 and autonomous driving control device 40 control vehicle 1 in an associated manner.

Sensor 50 is a collective term of various sensors for grasping a state of an own vehicle and a situation around the own vehicle. For example, sensor 50 includes a visible light camera, a light detection and ranging (LIDAR) device, a millimeter-wave radar, a vehicle speed sensor and a global positioning system (GPS).

The visible light cameras are disposed at least four positions including a front side, a rear side, and left and right sides of vehicle 1, and image images of the front side, the rear side and the left and right sides of vehicle 1. The LIDAR radiates beams (for example, infrared laser beams) to the surrounding of vehicle 1, receives reflection signals of the beams, and measures a distance between vehicle 1 and an object existing in the surrounding of vehicle 1, size of the object and the composition of the object based on the received reflection signals. The millimeter-wave radar radiates radio waves (millimeter waves) to the surrounding of vehicle 1, receives reflection signals of the millimeter waves, and measures a distance from vehicle 1 to an object existing in the surrounding based on the received reflection signals. The millimeter-wave radar can detect a remoter object which is difficult to detect by the LIDAR. The vehicle speed sensor detects a speed of vehicle 1. The GPS sensor detects the positional information of the vehicle 1. Specifically, the GPS sensor receives a respective plurality of points of time at which signals are transmitted from a plurality of GPS satellites, and calculates a longitude and a latitude of the signal reception point based on the received plurality of points of times at which signals are transmitted.

Autonomous driving control device 40 has processing part 41, input/output (I/O) part 42, and recording part 43. Processing part 41 can be realized by cooperative operations of a hardware resource and a software resource or only by a hardware resource. As the hardware resource, a processor, a read-only memory (ROM), a random access memory (RAM) and other large scale integrations (LSI) can be used. As the processor, a central processing unit (CPU), a graphics processing unit (GPU), a digital signal processor (DSP) or the like can be used. As the software resource, a program such as an operating system, an application, or a firmware can be used. I/O part 42 controls the connection between autonomous driving control device 40 and various external equipment. Recording part 43 is a non-volatile memory, and has a recording medium such as a NAND type flash memory chip, a solid state drive (SSD), a hard disk drive (HDD) or the like. Data necessary for autonomous traveling such as a three dimensional map is held in recording part 43.

Processing part 41 allows vehicle 1 to perform autonomous traveling based on a predetermined autonomous driving algorithm. Specifically, processing part 41 recognizes a situation of an own vehicle and surrounding of the own vehicle based on various detection data detected by sensor 50 and various information collected via radio communication from the outside. Processing part 41 determines the behavior of vehicle 1 by applying various parameters which indicate the recognized situation to the autonomous driving algorithm.

The autonomous driving algorithm is generated by artificial intelligence (AI) based on deep learning, for example. Various parameters of the autonomous driving algorithm are initially set to values learned in advance by a computer in accordance with high specification, and values updated from a data center on a cloud are suitably downloaded.

Processing part 41 controls operation objects based on a determined behavior. In the example shown in FIG. 4, the operation objects are steering wheel 3, accelerator pedal 4, brake pedal 5, blinker switch 6, headlight switch 7 and horn switch 8. For example, when the acceleration to a predetermined speed is determined, processing part 41 transmits a control signal to an electronic control unit (ECU) which controls accelerator pedal 4 via a vehicle loaded network. As the vehicle loaded network, for example, a controller area network (CAN) can be used. In the same manner, when the deceleration to a predetermined speed is determined, when steering to predetermined steering angle is determined, when flickering of the blinker is determined, when turning on/off of a headlight is determined, or when beeping of a horn is determined, processing part 41 transmits control signals to the respective ECUs.

Vehicle control device 10 has processing part 11, I/O part 12, and recording part 13. Processing part 11 includes detection information analyzing part 111, user interface (UI) control part 112 and association part 113. Function of processing part 11 can be realized by a cooperative operation of a hardware resource and a software resource. As the hardware resource, a processor, a ROM, a RAM or other LSIs can be used. As the processor, a CPU, a GPU, a DSP or the like can be used. As the software resource, a program such as an operating system, an application, or a firmware can be used. I/O part 12 controls the connection between autonomous driving control device 40 and various external equipment. Recording part 13 is a non-volatile memory, and has a recording medium such as a NAND type flash memory chip, a SSD, or HDD.

Cabin state detection part 20 is a sensor for detecting a position and a state of an occupant in vehicle 1, and a camera can be used as cabin state detection part 20, for example. The camera is disposed at a position that allows the camera to image the occupant in the cabin by taking into account a seat layout.

Figure 5:
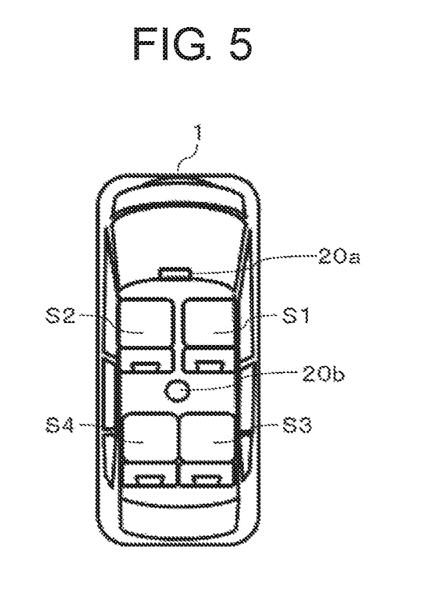
FIG. 5 is a view showing an installation example of a camera.

FIG. 5 is a view showing an installation example of cameras 20a, 20b. For example, camera 20a may be disposed above an inner rearview mirror. This installation position is effective for the detection of the position and the state of the occupant seated on a front-row seat. Camera 20b may be disposed on a center portion of a ceiling in the cabin. In this case, it is preferable to use a wide angle camera. This installation position allows camera 20b to detect the occupants in the cabin in a wide range.

By disposing the cameras at the plurality of portions in the cabin, it is possible to acquire more accurate information relating to the occupants. As cabin state detection part 20, a seat position sensor can be used also. For example, the position of the driver can be estimated based on the position of the drive seat.

The description is made by returning to FIG. 4. UI part 30 includes a plurality of touch panel displays 31, physical button 32, and speaker 33. Touch panel displays 31 are disposed at a plurality of portions in the cabin, and are formed of a liquid crystal display having a touch panel function, and an organic electro-luminescence (OEL) display having a touch panel function. Touch panel displays 31 also include a display of an existing car navigation device, and a display of a head unit such as a display audio.

Touch panel display 31 reproduces an image signal supplied from vehicle control device 10 and displays it, receives an operation of a user, and generates an operation signal corresponding to the received operation and outputs the operation signal to vehicle control device 10.

At least one physical button 32 is disposed in the cabin. Physical button 32 is one example of a physical inputting part, and a switch, a dial, a pad or the like may be also used. Physical button 32 receives an operation of a user, and generates an operation signal corresponding to the received operation and outputs the operation signal to vehicle control device 10. Speaker 33 outputs a voice by reproducing an audio signal supplied from vehicle control device 10.

Detection information analyzing part 111 acquires detection information which indicates at least either one of a position or a state of an occupant from cabin state detection part 20, and analyzes the acquired detection information. For example, in a case where detection information analyzing part 111 acquires image data of the cabin as detection information, detection information analyzing part 111 analyzes the acquired image data. Detection information analyzing part 111 detects a face of the occupant from the content of the image using a face classifier, for example. The face classifier can be generated by learning a Haar-like feature amount based on a plurality of sample images on which the face is imaged.

Detection information analyzing part 111 can estimate the position of the occupant in the cabin based on the position and the size of the detected face in the images. Detection information analyzing part 111 can estimate the direction of the face of the occupant using a plurality of kinds of face classifiers such as a front face classifier, a side face classifier and the like as classifiers. The position of the seat may be taken into account in the estimation of the position of the occupant.

UI control part 112 determines touch panel display 31 which is the most easily operable for the occupant among the plurality of touch panel displays 31 corresponding to at least one of the position and the state of the occupant estimated by detection information analyzing part 111. Specifically, UI control part 112 determines touch panel display 31 disposed closest to the occupant among touch panel displays 31 existing in a field of view of the occupant.

Association part 113 performs transmission and reception of commands with autonomous driving control device 40. In the exemplary embodiment, a situation is considered where processing part 41 of autonomous driving control device 40 detects a predetermined event relating to traveling of vehicle 1, and determines the content of processing scheduled to be performed on the detected event. It is necessary or preferable to acquire the consent of an occupant (hereinafter estimating a driver) depending on the determined content of the processing. In the case of the content of the processing where the acquisition of the consent of the driver is necessary or preferable, processing part 41 of autonomous driving control device 40 transmits a command which requests the acquisition of the consent to the determined content of the processing to vehicle control device 10.

When association part 113 of vehicle control device 10 receives the command, UI control part 112 displays a message of a consent request to the content of the processing on touch panel display 31 determined above which is the most easily operable for the driver. In this case, UI control part 112 may output the message as a voice from speaker 33. UI control part 112 accepts a consent operation to the above-mentioned consent request to most easily operable touch panel display 31 as a valid operation.

For example, in the layouts shown in FIG. 1A and FIG. 1B, in a case where the driver operates steering wheel 3 at the position close to steering wheel 3, UI control part 112 selects second touch panel display 31b as most easily operable touch panel display 31.

On the other hand, in the layout shown in FIG. 3A and FIG. 3B, in a case where the driver is sitting facing backward, UI control part 112 selects fifth touch panel display 31e as most easily operable touch panel display 31.

Figure 6A:
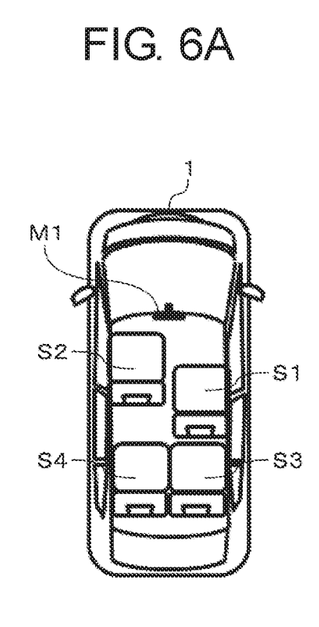
Figure 6B:
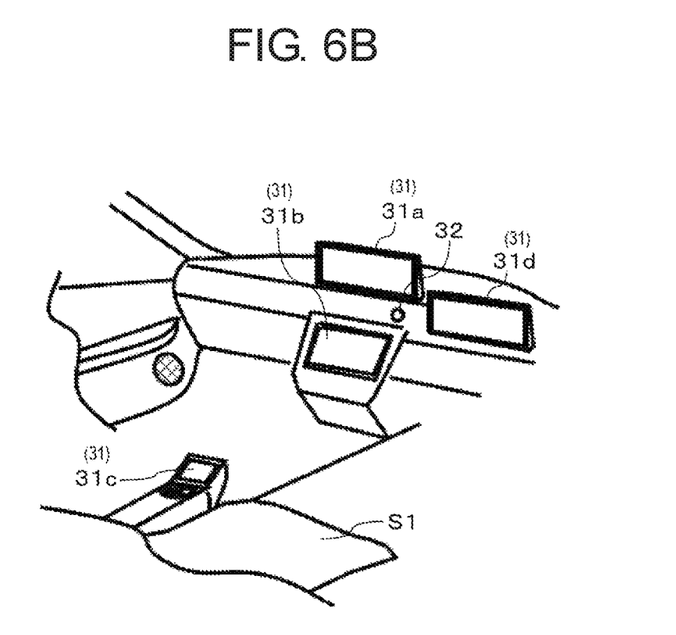

FIG. 6A and FIG. 6B are views showing a state where the layout in the vehicle 1 shown in FIG. 2A and FIG. 2B is changed. Specifically, FIG. 6A and FIG. 6B show the state where the position of right front seat S1 is moved backward. Center console is also moved backward together with right front seat S1. In such a state, UI control part 112 selects third touch panel display 31c disposed on the center console as most easily operable touch panel display 31.

UI control part 112 may display a message of the consent request not only on most easily operable touch panel display 31 but also on other touch panel displays 31. For example, UI control part 112 may display a message of the consent request on second most easily operable touch panel display 31 or on all touch panel displays 31 in the cabin. UI control part 112 may display a message of the consent request only on touch panel displays 31 existing within a field of view of a driver.

Further, in making speaker 33 verbally output a message of the consent request, UI control part 112 may determine touch panel display 31 which is most easily operable for a driver based on only the position of a driver. That is, UI control part 112 selects touch panel display 31 physically closest to a driver regardless of the direction that a face of the driver is directed.

The UI control part 112 may limit or may not limit touch panel display 31 which accepts a consent operation of a driver to the above-mentioned consent request as a valid operation to most easily operable touch panel display 31. For example, in a case where physical button 32 exists for performing the content of the processing which is an object of the consent request, UI control part 112 accepts a consent operation to physical button 32 as a valid operation. With respect to an operation of vehicle 1, there are also many drivers who can operate with a sense of security using conventionally existing physical button 32.

UI control part 112 may accept a consent operation to the above-mentioned consent request to touch panel displays 31 other than the above-mentioned most easily operable touch panel display 31 as a valid operation. UI control part 112 may switch validity of a consent operation to touch panel display 31 which is most difficult to operate between a valid state and an invalid state based on the presence or non-presence of a fellow passenger other than a driver. In a case where a fellow passenger is in the cabin, there is a possibility that the fellow passenger touches touch panel display 31 disposed close to the fellow passenger against the intention of a driver. Accordingly, in a case where a fellow passenger is in the cabin, UI control part 112 treats only an operation to touch panel display 31 which is most easily operable for a driver as a valid operation. On the other hand, in a case where no fellow passenger is in the cabin, UI control part 112 treats an operation to all touch panel displays 31 in the cabin as a valid operation.

Figure 7:
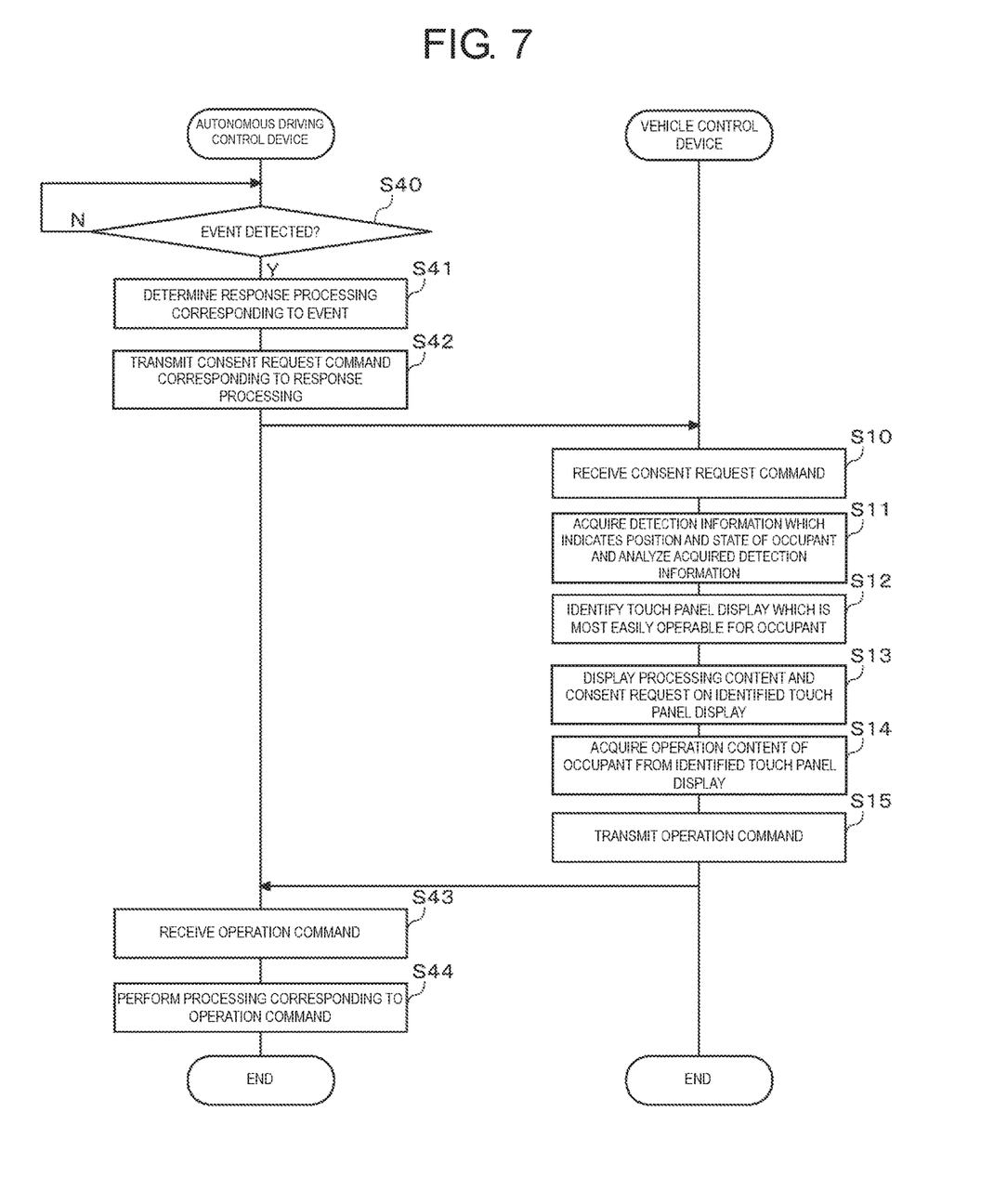
FIG. 7 is a flowchart showing an operation of a drive assist system according to the exemplary embodiment of the present disclosure.

FIG. 7 is a flowchart showing an operation of drive assist system 2 according to the exemplary embodiment of the present disclosure. When processing part 41 of autonomous driving control device 40 detects an event relating to traveling of vehicle 1 (Y in S40), processing part 41 determines response processing corresponding to the detected event (S41). Hereinafter, it is assumed, as the detection of the event, that the detection of a phenomenon where the continuation of an autonomous driving mode has become difficult. For example, when the processing part cannot detect a preceding vehicle and a white line on a road, the continuation of autonomous driving becomes difficult. Processing part 41 determines switching to a manual driving mode as the response processing corresponding to the phenomenon. This exemplary embodiment includes a mode where manual driving and autonomous driving coexist in the manual driving mode.

Processing part 41 transmits a consent request command corresponding to the determined response processing to vehicle control device 10 (42). The consent request command includes the content of the response processing and a response time for responding a consent request. Association part 113 of vehicle control device 10 receives a consent request command from autonomous driving control device 40 (S10). Detection information analyzing part 111 acquires detection information which indicates the position and the state of an occupant from cabin state detection part 20, and analyzes the detection information (S11). Detection information analyzing part 111 may perform the acquisition and the analysis processing of the detection information using the reception of a consent request command as a trigger, or may constantly perform the acquisition and the analysis processing of the detection information.

UI control part 112 identifies touch panel display 31 which is most easily operable for an occupant based on an analysis result acquired by detection information analyzing part 111 (S12). UI control part 112 allows identified touch panel display 31 to display the content of response processing and a message of a consent request (S13).

Figure 8:
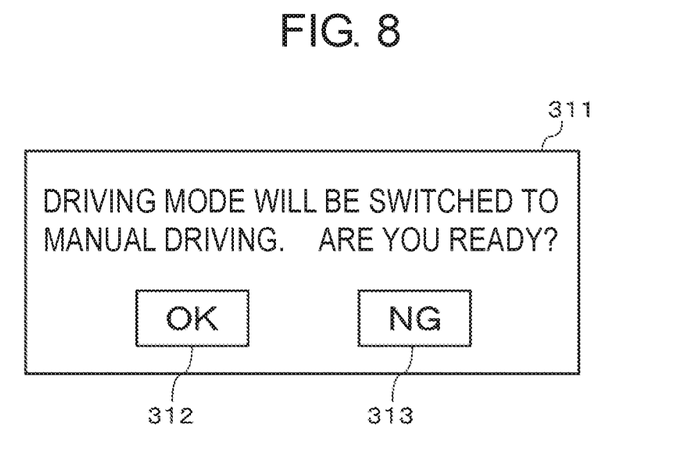
FIG. 8 is a view showing an example of a consent request screen displayed on a touch panel display.

FIG. 8 is a view showing an example of consent request screen 311 displayed on touch panel display 31. In the example shown in FIG. 8, a message "Driving mode will be switched to manual driving. Are you ready?", OK (consent) key 312, and NG (refusal) key 313 are displayed on consent request screen 311. The occupant (driver) pushes down OK key 312 when he/she is ready, and pushes down NG key 313 when he/she is not ready.

The description is made by returning to FIG. 7. UI control part 112 acquires the operation content of the occupant from identified touch panel display 31 (S14). In a case where an operation is not performed within a designated response time, it is treated that NG key 313 is pushed down. Association part 113 transmits an operation command containing the acquired operation content to autonomous driving control device 40 (S15).

Processing part 41 of autonomous driving control device 40 receives an operation command from vehicle control device 10 (S43). Processing part 41 performs processing corresponding to the received operation command (S44). For example, in a case where the operation content is "consent", an operation mode is switched from an autonomous driving mode to a manual driving mode. In a case where the operation content is "refusal", vehicle 1 is moved to a road shoulder and is stopped.

Figure 9A:
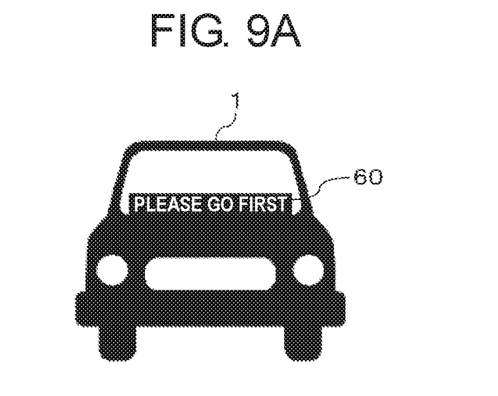
FIG. 9A is a view for illustrating another example of an event and response processing.
Figure 9B:
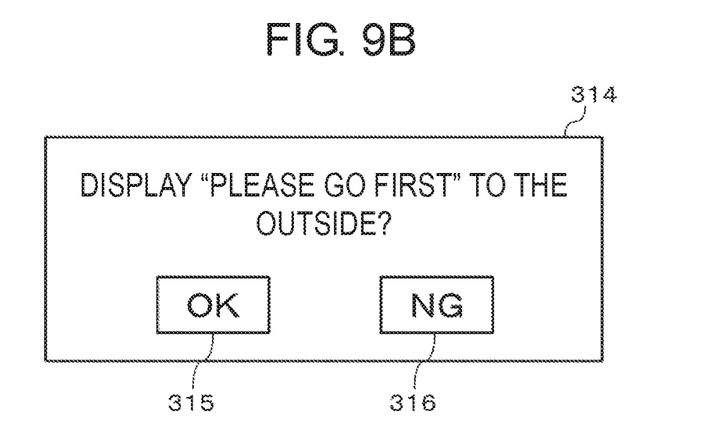
FIG. 9B is a view for illustrating another example of an event and response processing.

FIG. 9A and FIG. 9B are views for illustrating another example of an event and response processing. In this example, vehicle 1 has external display 60 for transmitting a message to the outside of the vehicle. As shown in FIG. 9A, external display 60 is disposed at a lower part of a windshield, for example. External display 60 may be disposed at an upper part of the windshield or on a front grill.

There arises a case where a driver wishes to communicate with a pedestrian around vehicle 1 or a driver of another vehicle during traveling of vehicle 1. For example, there is a case where the driver wishes to send a sign to a pedestrian who is standing by in front of a crosswalk so as to prompt him to cross the crosswalk. Further, there is also a case where a driver wishes to send a sign to a driver of another vehicle to go first at an intersection having no signal or the like. There is also a case where one driver wishes to send a sign expressing his gratitude to another driver of another vehicle who allows one driver to go first.

As the detection of an event in a case where a driver wishes to communicate with the outside in this manner, for example, the detection of a pedestrian who is standing by in front of a crosswalk is named. FIG. 9B is a view showing an example of consent request screen 314 displayed on touch panel display 31 when the pedestrian is detected. In the example shown in FIG. 9B, a message "display "please go first" to the outside?", OK key 315, and NG key 316 are displayed on the consent request screen 314. The occupant (driver) pushes down OK key 315 when the occupant wishes to display the message, and pushes down NG key 316 when the occupant does not wish to display the message.

A communication method with the outside is not limited to the display of a message on external display 60. For example, a transmission method such as beeping a horn with a small sound volume or flashing of a headlight is also possible.

There is a possibility that pedestrians, neighboring residents, or occupants of other vehicles consider communication notification to the outside as an annoying behavior. Accordingly, it is preferable that processing part 41 confirm the intension of a driver before processing part 41 performs communicator notification to the outside.

As described heretofore, according to the exemplary embodiment, processing part 41 displays notification from the vehicle to the occupant on touch panel display 31 which is most easily operable for the occupant, and makes the operation of touch panel display 31 valid. Accordingly, the quick transmission to an occupant and quick operation by the occupant can be realized regardless of a seat layout in the cabin, the position of the occupant, and the direction of the face of the occupant. Particularly, this exemplary embodiment provides a technique which is effective in a situation where quick determination of an occupant is requested such as switching to manual driving mode, communication notification to the outside or the like described above. When an occupant can quickly determine his intension, it is possible to reduce possibility that an autonomous driving vehicle performs an emergency stop.

The present disclosure is described above according to the exemplary embodiment. It will be understood by those skilled in the art that the exemplary embodiment is merely an example, other exemplary modifications in which components and/or processes of the exemplary embodiment are variously combined are possible, and the other exemplary modifications still fall within the scope of the present disclosure.

Figure 10:
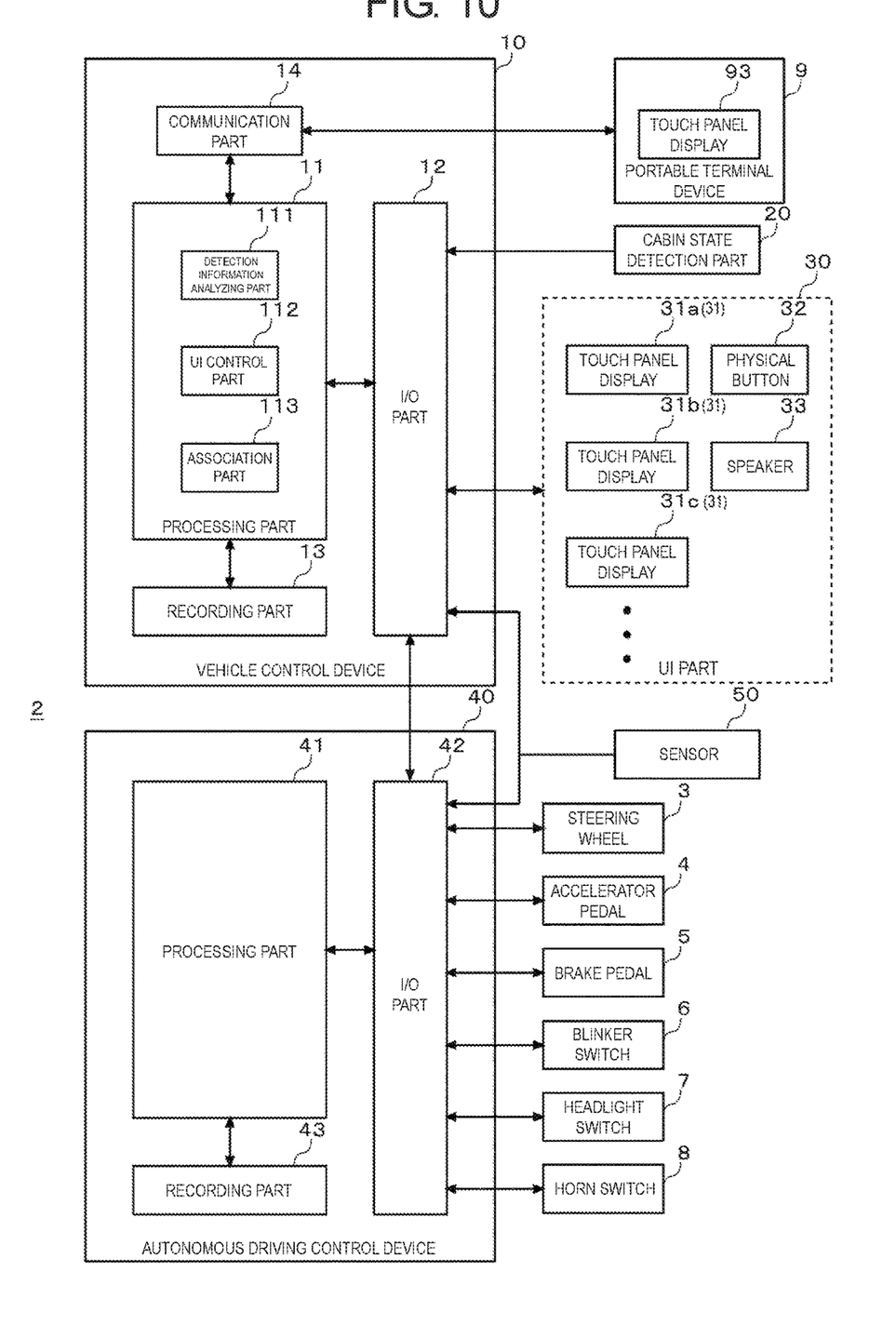
FIG. 10 is a block diagram showing a configuration of a drive assist system according to modification 1 of the present disclosure.

FIG. 10 is a block diagram showing a configuration of drive assist system 2 according to modification 1 of the present disclosure. In modification 1, drive assist system 2 is associated with portable terminal device 9 which an occupant brings into the vehicle. Portable terminal device 9 may be portable equipment having a communication function. For example, portable terminal device 9 may be a smartphone, a feature phone, a tablet, a notebook personal computer (PC), a portable music player, a portable game machine or the like. Portable terminal device 9 has touch panel display 93.

Vehicle control device 10 of modification 1 has communication part 14 for performing short-distance communication with portable terminal device 9. Communication part 14 executes communication processing in accordance with a short-distance radio communication standard such as Wi-Fi (registered trademark), Bluetooth (registered trademark). In modification 1, it is considered that touch panel display 31 in a cabin also includes touch panel display 93 of portable terminal device 9 with a power source set in an ON state. Touch panel display 31 in the cabin does not include touch panel display 93 of portable terminal device 9 with the power source set in an OFF state.

Detection information analyzing part 111 analyzes an image imaged by a camera in the cabin, and detects the position of portable terminal device 9 and the direction of touch panel display 93. UI control part 112 determines a touch panel display which is most easily operable for an occupant among a plurality of touch panel displays in the cabin including touch panel display 93 of portable terminal device 9.

In a case where the position of portable terminal device 9 in the cabin and the direction of touch panel display 93 cannot be detected, UI control part 112 determines touch panel display 31 which is most easily operable for an occupant among a plurality of touch panel displays 31 excluding touch panel display 93 of portable terminal device 9 in the cabin. UI control part 112 displays a consent request message on both determined touch panel display 31 and touch panel display 93 of portable terminal device 9, and accepts a consent operation to either one of these touch panel displays as a valid operation.

Figure 11A:
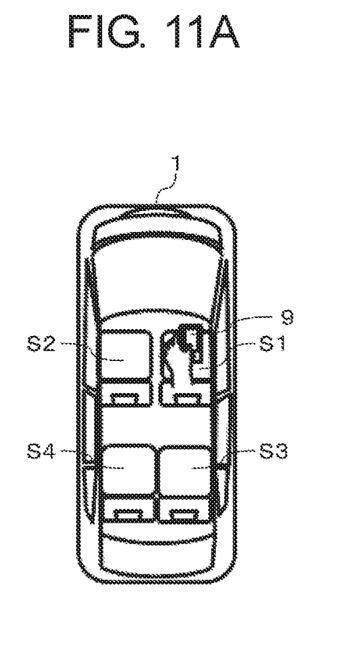
FIG. 11A is a view showing a mode in a vehicle in a state where a driver is using a portable terminal device.
Figure 11B:
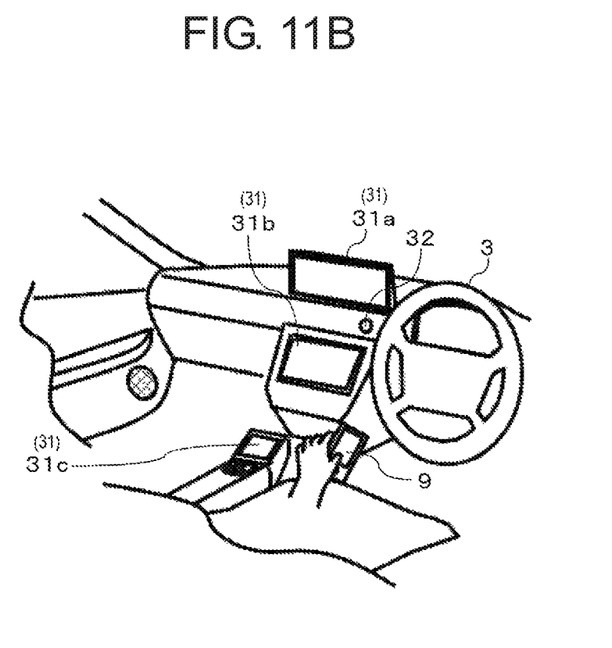
FIG. 11B is a view showing the mode in the vehicle in a state where the driver is using the portable terminal device.

FIG. 11A and FIG. 11B are views showing the mode in vehicle 1 in a state where the driver is using portable terminal device 9. In an autonomous driving mode, it is unnecessary for a driver to perform a driving operation during traveling. Accordingly, the driver can browse a website, watch a video or the like using portable terminal device 9. In a state shown in FIG. 11A and FIG. 11B, UI control part 112 selects touch panel display 93 of portable terminal device 9 as a most easily operable touch panel display.

As has been described above, according to modification 1, it is possible to realize quick information transmission to an occupant looking at portable terminal device 9 such as a smartphone, and to realize a quick response operation by the occupant.

Figure 12:
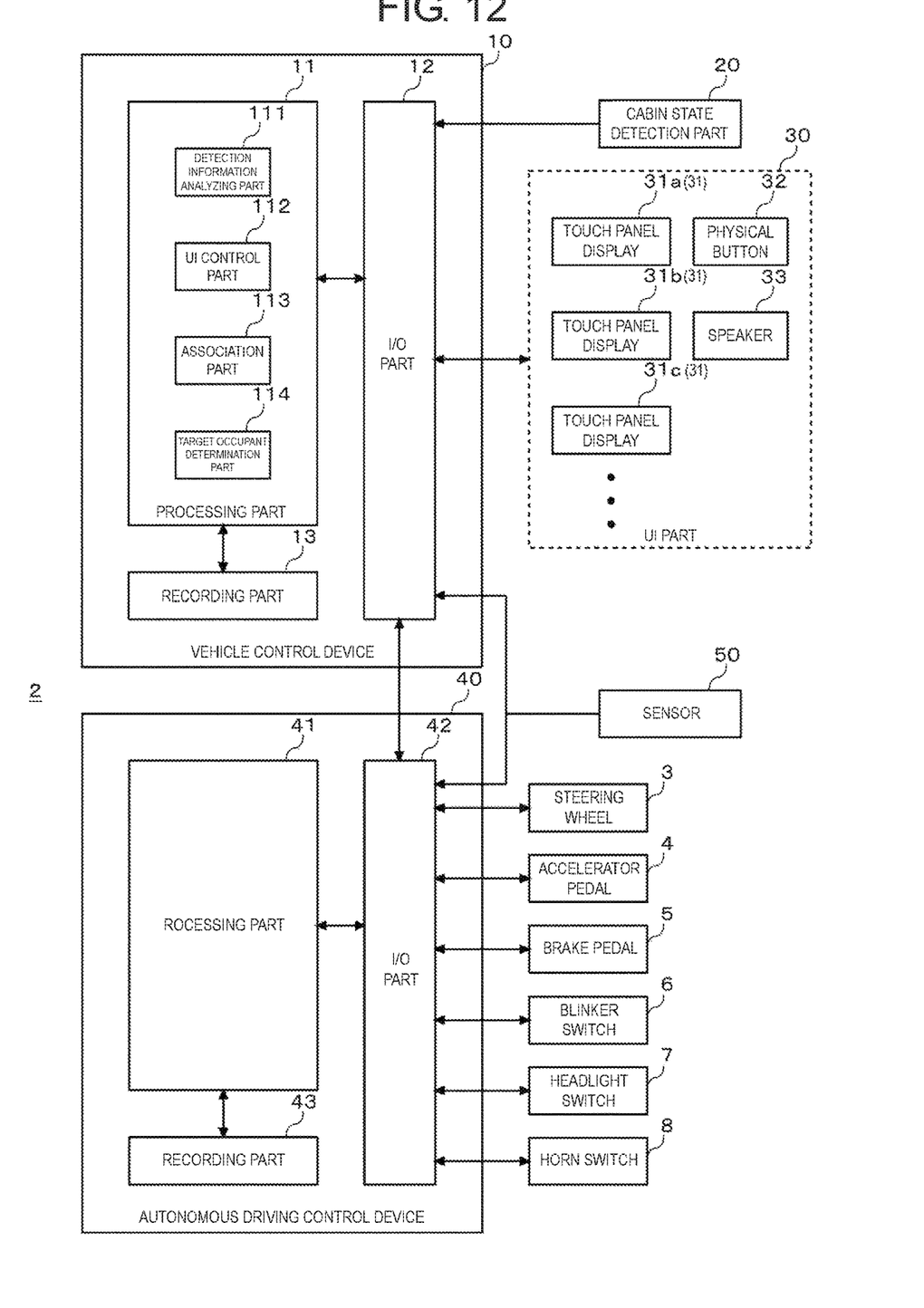
FIG. 12 is a block diagram showing a configuration of a drive assist system according to modification 2 of the present disclosure.

FIG. 12 is a block diagram showing a configuration of drive assist system 2 according to modification 2 of the present disclosure. In modification 2, it is assumed that a plurality of occupants exist in a cabin. In modification 2, processing part 11 of vehicle control device 10 further includes target occupant determination part 114. Target occupant determination part 114 determines an occupant to whom a consent request message is to be notified among a plurality of occupants based on authorities or attributes of the plurality of occupants in the cabin.

Target occupant determination part 114 basically determines an occupant having a driving authority as the occupant to whom a consent request message is to be notified. For example, a face image of an owner of vehicle 1 is registered in vehicle control device 10 in advance. When a different person drives vehicle 1, a face image of the person is imaged and registered. In a case where a plurality of occupants exist in a cabin, target occupant determination part 114 determines the occupant whose face is registered as the occupant having driving authority. In a case where a plurality of occupants whose faces are registered exist in a cabin, target occupant determination part 114 determines the occupant seated on a driving seat as an occupant having driving authority.

The processing content which becomes an object of a consent request may include a processing content having a nature which can give the consent to even an occupant having no driver license. For example, with respect to a consent request which is requested when autonomous driving control device 40 determines a parking position in a parking space, a consent request which is requested when autonomous driving control device 40 determines to make a vehicle enter a gas station or an electricity charging station, a consent request which is requested when autonomous driving control device 40 determines a route change for avoiding a traffic jam, such consent requests are consent requests of a nature having no problem even when an occupant other than an occupant having driving authority consents.

In this case, even when an occupant having driving authority does not exist in the cabin, target occupant determination part 114 determines an occupant seated on a predetermined seat as an occupant to whom a consent request message is notified. Priority order (for example, right front seat S1→left front seat S2→right rear sheet S3→left rear sheet S4) is allocated to the seats in the cabin in advance, and target occupant determination part 114 selects a candidate for an occupant to whom a consent request message is notified in accordance with the priority order. In such an operation, target occupant determination part 114 takes into account attributes of the occupants. For example, when it is estimated that the occupant is a child or an older senior person, the occupant is excluded from a candidate. Further, an occupant estimated to be sleeping is also excluded from a candidate.

The processing content which is an object of a consent request is a processing content having a nature which requests an occupant to acquire a consent of an occupant having driving authority, and an occupant who is awake and has driving authority does not exist, target occupant determination part 114 returns an NG command to vehicle control device 10.

As has been described above, according to modification 2, in a case where a plurality of occupants exist in the cabin, it is possible to transmit a consent request message to a most suitable operation possible person.

In the above description, the description has been made with respect to a case where the display of a consent request message on touch panel display 31 which is most easily operable for an occupant is indispensable. In this point, in a case where a consent request message is displayed on other touch panel display 31 or in a case where a voice is outputted from speaker 33, the display of a consent request message on most easily operable touch panel display 31 is not indispensable.

Further, in the above-mentioned description, as a device which indicates a consent request message and accepts a consent operation, the description is made by taking a touch panel display as an example. However, the device which accepts a consent operation is not always limited to a touch panel display. A combination of a display having no touch panel function and a physical key disposed in the vicinity of the display may be also adopted. That is, a device may be adopted where a display function and an operation inputting function are integrated or the display function and the operation inputting function are disposed close to each other.

It is to be noted that the exemplary embodiment may be identified by items described below.

[Item 1]

A drive assist method includes: detecting at least one of a position or a state of at least one occupant in a vehicle (1); determining an operation inputting part (31) that is most easily operable for the at least one occupant from among a plurality of operation inputting parts (31) in the vehicle (1) based on the at least one of the position or the state of the at least one occupant which is detected in the detecting; notifying a consent request in the vehicle (1) with respect to a processing content scheduled to be performed in response to an occurrence of an event; and validating consent operation to the operation inputting part (31) that is most easily operable.

Accordingly, an occupant can quickly respond to notification from vehicle (1) to the occupant.

[Item 2]

In the drive assist method described in item 1, in determining the operation inputting part (31) that is most easily operable, one of the plurality of operation inputting parts (31) disposed closest to the at least one occupant is determined as the operation inputting part (31) that is most easily operable.

The operation inputting part (31) that is most easily operable may be an operation inputting part (31) disposed closest to an occupant among operation inputting parts (31) existing in a field of view of the occupant.

Accordingly, the occupant can quickly perform an operation without largely moving his hand.

[Item 3]

In the drive assist method described in item 1 or item 2, the plurality of operation inputting parts (31) are a plurality of touch panel displays (31), and in notifying the consent request, the consent request with respect to the processing content is displayed on the operation inputting part (31) that is most easily operable.

Accordingly, it is possible to display a consent request at the position where an occupant can easily look at the consent request.

[Item 4]

In the drive assist method described in any one of items 1 to 3, the plurality of operation inputting parts (31, 93) includes a portable terminal device (9) of the at least one occupant.

Accordingly, an occupant can perform a response operation to portable terminal device (9).

[Item 5]

In the drive assist method described in any one of items 1 to 4, the at least one occupant includes a plurality of occupants, and the drive assist method further includes deciding an occupant to whom notification is made from among the plurality of occupants based on authorities or attributes of the plurality of occupants.

Accordingly, a consent request can be notified to the most suitable occupant.

[Item 6]

In the drive assist method described in any one of items 1 to 5, the vehicle (1) is an autonomous driving vehicle, the occurrence of the event is the occurrence of a phenomenon where continuation of autonomous driving becomes difficult during the autonomous driving, and the processing content scheduled to be performed in response to the occurrence of the event is switching to manual driving.

Accordingly, an occupant can quickly respond to a switching request from autonomous driving to manual driving.

[Item 7]

In the drive assist method described in any one of items 1 to 5, the vehicle (1) is a vehicle that autonomously performs at least a portion of driving operation, the occurrence of the event is an occurrence of necessity of sending a sign or a message to an outside of the vehicle (1), and the processing content scheduled to be performed in response to the occurrence of the event is processing for sending the sign or the message to the outside of the vehicle (1).

Accordingly, an occupant can quickly respond to a consent request with respect to communication notification to the outside.

[Item 8]

A non-transitory computer-readable storage medium stores a program for causing a computer to execute a process including: detecting at least one of a position or a state of an occupant in a vehicle (1); determining an operation inputting part (31) that is most easily operable for the occupant from among a plurality of operation inputting parts (31) in the vehicle (1) based on the at least one of the position or the state of the occupant which is detected in the detecting; notifying a consent request in the vehicle (1) with respect to a processing content scheduled to be performed in response to an occurrence of an event; and validating consent operation to the operation inputting part (31) that is most easily operable.

Accordingly, an occupant quickly respond to notification from vehicle (1) to the occupant.

[Item 9]

A vehicle control device (10) includes: a detection information acquisition part (111) that acquires detection information on at least one of a position or a state of an occupant from a detection part (20) for detecting the at least one of the position or the state of the occupant in a vehicle (1); and a user interface control part (112) that determines an operation inputting part (31) that is most easily operable for the occupant from among a plurality of operation inputting parts (31) in the vehicle based on the acquired detection information. The user interface control part (112) causes a consent request to be informed in the vehicle (1) with respect to a processing content scheduled to be performed in response to an occurrence of an event, and validates consent operation to the operation inputting part (31) that is most easily operable.

Accordingly, an occupant quickly respond to notification from vehicle control device (10) to the occupant.

The present disclosure is useful as a drive assist method, a drive assist program, and a vehicle control device applicable to a vehicle on which a plurality of operation inputting parts are installed.

What is claimed is:

1. A drive assist method comprising:
   detecting a position and a direction of a face of at least one occupant in a vehicle;
   determining a displaying and operation inputting part that is most easily operable for the at least one occupant from among a plurality of displaying and operation inputting parts in the vehicle based on the position and the direction of the face of the at least one occupant which are detected in the detecting;
   notifying, by displaying on the displaying and operation inputting part that is most easily operable, a consent request with respect to a processing content scheduled to be performed in response to an occurrence of an event; and
   validating a consent operation to the displaying and operation inputting part that is most easily operable,
   wherein the plurality of displaying and operation inputting parts includes a displaying and operation inputting part disposed behind the at least one occupant, and
   the displaying and operation inputting part disposed behind the at least one occupant is determined as the displaying and operation inputting part that is most easily operable in the determining, when the direction of the face of the at least one occupant is detected to be backward in the detecting.

2. The drive assist method according to claim 1, wherein in determining the displaying and operation inputting part that is most easily operable, one of the displaying and operation inputting parts disposed closest to the at least one occupant from among the plurality of displaying and operation inputting parts is determined as the displaying and operation inputting part that is most easily operable.

3. The drive assist method according to claim 1, wherein the plurality of displaying and operation inputting parts is a plurality of touch panel displays.

4. The drive assist method according to claim 1, wherein the plurality of displaying and operation inputting parts includes a portable terminal device of the at least one occupant.

5. The drive assist method according to claim 1,
   wherein the at least one occupant includes a plurality of occupants, and
   the drive assist method further comprises deciding an occupant to whom the notifying is performed from among the plurality of occupants based on authorities or attributes of the plurality of occupants.

6. The drive assist method according to claim 1, wherein the vehicle is an autonomous driving vehicle,
   the occurrence of the event is an occurrence of a phenomenon where continuation of autonomous driving becomes difficult during the autonomous driving, and
   the processing content scheduled to be performed in response to the occurrence of the event is switching the autonomous driving to manual driving.

7. The drive assist method according to claim 1, wherein the vehicle autonomously performs at least a portion of a driving operation,
   the occurrence of the event is necessity of sending a sign or a message to an outside of the vehicle, and
   the processing content scheduled to be performed in response to the occurrence of the event is processing for sending the sign or the message to the outside of the vehicle.

8. The drive assist method according to claim 1, wherein, in a case where a passenger occupant is in the vehicle, the consent operation is validated in the validating only as an operation to the displaying and operation inputting part that is most easily operable.

9. The drive assist method according to claim 8, wherein, in a case where no passenger occupant is in the vehicle, the consent operation is validated in the validating as an operation to any of the plurality of displaying and operation inputting parts.

10. The drive assist method according to claim 1, wherein, in the notifying, the consent request is displayed on each of the plurality of displaying and operation inputting parts that exists within a field of view of the at least one occupant.

11. A non-transitory computer-readable storage medium storing a program for causing a computer to execute a process, the process comprising:
    detecting a position and a direction of a face of an occupant in a vehicle;
    determining a displaying and operation inputting part that is most easily operable for the occupant from among a plurality of displaying and operation inputting parts in the vehicle based on the position and the direction of the face of the occupant which are detected in the detecting;
    notifying, by displaying on the displaying and operation inputting part that is most easily operable, a consent request with respect to a processing content scheduled to be performed in response to an occurrence of an event; and
    validating a consent operation to the displaying and operation inputting part that is most easily operable,
    wherein the plurality of displaying and operation inputting parts includes a displaying and operation inputting part disposed behind the at least one occupant, and
    the displaying and operation inputting part disposed behind the at least one occupant is determined as the displaying and operation inputting part that is most easily operable in the determining, when the direction of the face of the at least one occupant is detected to be backward in the detecting.

12. A vehicle control device, comprising:
    a memory; and
    a processor coupled to the memory and configured to perform a process, the process including:
      detecting a position and a direction of a face of at least one occupant in a vehicle;
      determining a displaying and operation inputting part that is most easily operable for the occupant from among a plurality of displaying and operation inputting parts in the vehicle based on the position and the direction of the face of the at least one occupant which are detected in the detecting;
      notifying, by displaying on the displaying and operation inputting part that is most easily operable, a consent request with respect to a processing content scheduled to be performed in response to an occurrence of an event; and
      validating a consent operation to the displaying and operation inputting part that is most easily operable,
    wherein the plurality of displaying and operation inputting parts includes a displaying and operation inputting part disposed behind the at least one occupant, and
    the displaying and operation inputting part disposed behind the at least one occupant is determined as the displaying and operation inputting part that is most easily operable in the determining, when the direction of the face of at least one occupant is detected to be backward in the detecting.

* * * * *